May 8, 1956 G. E. FORD 2,745,028
POINTER BEARING FOR INDICATING INSTRUMENTS
Original Filed Jan. 16, 1948

GEORGE E. FORD
INVENTOR.

BY Charles Shepard
ATTORNEY

United States Patent Office 2,745,028
Patented May 8, 1956

2,745,028

POINTER BEARING FOR INDICATING INSTRUMENTS

George E. Ford, Brighton, N. Y., assignor to Qualitrol Corporation, East Rochester, N. Y., a corporation of New York Original application January 16, 1948, Serial No. 2,576, now Patent No. 2,620,412, dated December 2, 1952. Divided and this application November 15, 1952, Serial No. 320,743

5 Claims.  (Cl. 310—104)

This invention relates to a pointer bearing for indicating instruments, especially but not exclusively instruments of the magnetically driven type, such as liquid level gauges, for example.

An object of the invention is the provision of a generally improved and more satisfactory pointer bearing for such instruments.

Another object is the provision of a pointer bearing so designed and constructed that, with a minimum of effort and expense, an accurate bearing of relatively low friction may be produced.

Another object is the provision of a bearing of small size, so designed as to have long life when subjected to end thrust forces as well as lateral or side thrust forces.

A further object is the provision of an improved method or process for making such a bearing.

Figure 1:
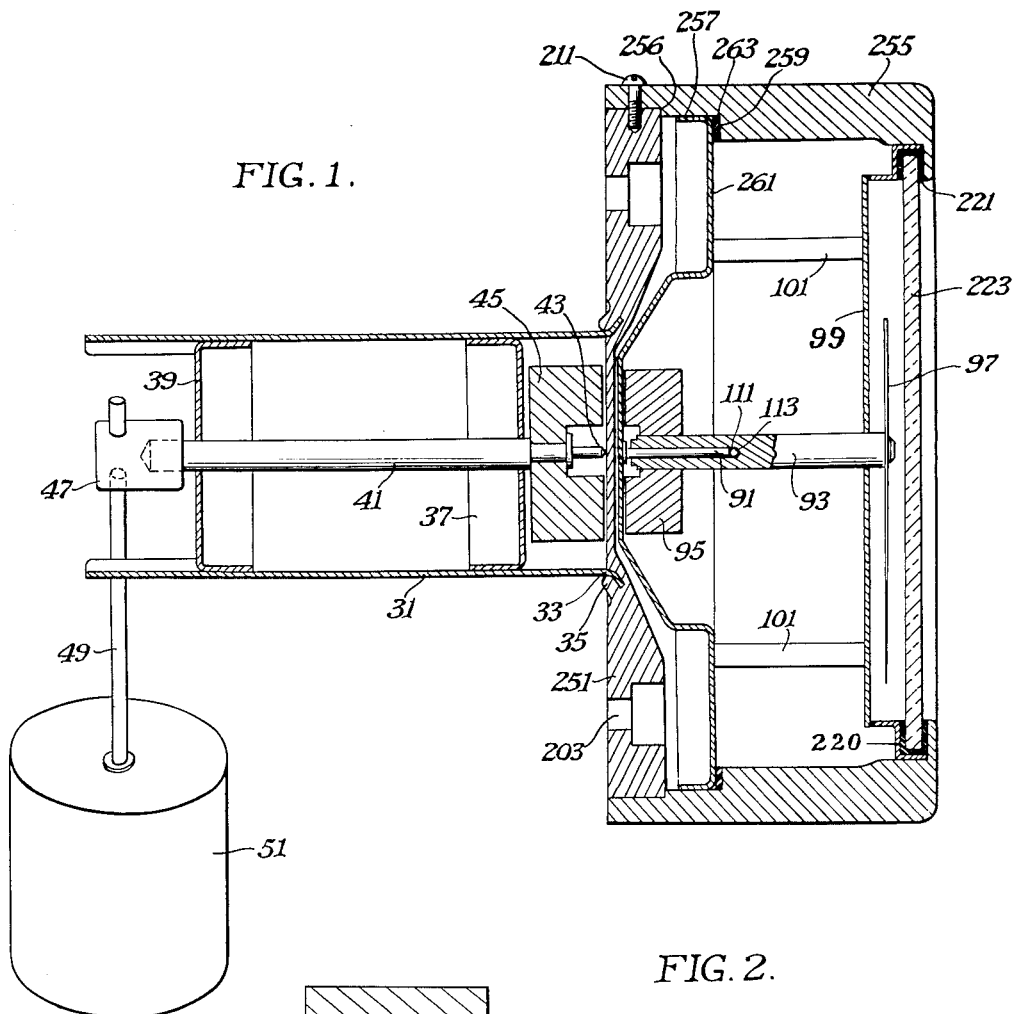
Figure 2:
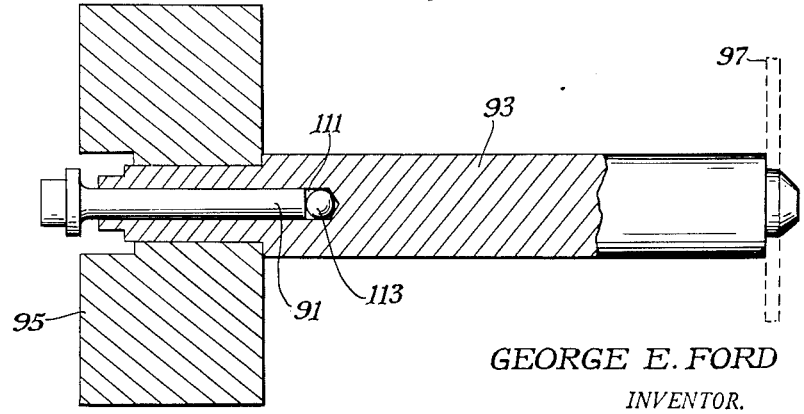

These and other desirable objects are accomplished by the construction disclosed as an illustrative embodiment of the invention in the following description and in the accompanying drawings forming a part hereof, in which:

Fig. 1 is a vertical section taken centrally through one typical form of indicating instrument with which the present invention may be used, showing the present invention applied thereto; and Fig. 2 is a section taken longitudinally through the pointer bearing of the present invention, on a larger scale.

The same reference numerals throughout the several views indicate the same parts.

The present application is a division of the United States patent application of George E. Ford, Serial No. 2,576, filed January 16, 1948, for Alarm Gauge, now Patent 2,620,412, granted December 2, 1952.

In many indicating instruments, the pointer or hand is relatively small, and must be supported by a relatively small shaft. The force or power available for turning the pointer or hand from one position to another is frequently very slight, so that if the instrument is to give accurate indications, it is necessary for the pointer shaft to have a bearing which has very low friction, so that the small forces available for moving the pointer will move it in every case, even though the increment of movement may be very slight. In addition, when the instrument happens to be of the magnetically driven type, the pointer shaft is subjected to a substantial end thrust or longitudinal thrust, due to the magnetic attraction between the driving magnet which is mounted on the operating part of the mechanism, and the driven magnet which is secured to the pointer shaft. Also, the magnet itself, adds considerably to the weight of the pointer shaft assembly, so that in such a case the bearing of the pointer shaft must be capable of functioning accurately and in a comparatively friction-free manner during long periods of use, even though constantly subjected to an end thrust or longitudinal thrust in addition to a lateral thrust or side thrust. The present invention provides a bearing which satisfies these requirements, and a method or process for making such bearing which is relatively rapid and inexpensive.

Referring first to Fig. 1, there is here shown somewhat diagrammatically a gauge of the liquid level type, comprising a main mounting plate 251 having holes 203 through which bolts may extend to secure the plate tightly against the front face of a tank or container on which the gauge is to be used. Mounted on the rear face of the plate 251 is a tube 31 projecting rearwardly through a suitable opening in the tank or container, into the interior thereof. The forward end of the tube 31 is flared as at 33 and that portion of the mounting plate 251 around the flared end of the tube is staked or swaged down over the flared end of the tube as at 35 to form a permanent connection.

A pair of pressed metal cup-shaped members 37 and 39 are pressed into the tube 31 and are centrally apertured to form bearings for a shaft 41 which has a pointed forward end 43 forming a thrust bearing abutting against the rear face of the plate 251. Fixed to the forward end of the shaft 41 is a permanent magnet 45, while the rear end of the shaft 41, a little to the rear of the rearmost bearing plate 39, carries a hub 47 fixed to the shaft and secured to a radial float arm 49 carrying a float member 51. The ends of the tube 31 extend rearwardly to a point slightly behind the hub 47, to protect the hub from contact with external articles, and the sides of the tube 31 are cut away opposite the radial arm 49, far enough to allow the radial arm its desired range of movement.

The mounting plate 251 is of any desired peripheral configuration, usually square or circular, the latter being preferred in most instances. Embracing the periphery of this plate 251 is a bezel member 255 held to the plate 251 by a series of radial screws 211. Ahead of the part which embraces the periphery of the mounting plate is a narrow shoulder 256 leading to a cylindrical internal surface 257, the forward end of which is defined by the rearwardly faced shoulder 259. The case 261 is a tight press fit in the portion 257 of the bezel, and a gasket 263 is compressed between the front of the case 261 and the shoulder 259, providing permanent tight sealing at this point. The bezel may be staked over the rear edge of the case 261 if desired, the shoulder 256 providing a convenient ledge to be engaged by a staking tool, or the tight press fit of the case in the bezel may be relied upon for permanently holding the case in fixed position without staking.

The case 261 is preferably dished rearwardly at its central portion, as shown, so that this central portion lies substantially in contact with the front face of the mounting plate 251. At the center of the case a stud or pin 91 is securely riveted to the case and projects forwardly therefrom, the pin preferably also being brazed or soldered to the case if extra precautions are desired, in addition to the riveting operation, to obtain a perfectly tight seal of the interior of the gauge. This stud or pin 91 forms a bearing on which is rotatably mounted a post 93, the rear end of which has fixed thereto a permanent magnet 95, and the forward end of which has fixed thereto a pointer or hand 97.

As is well understood in the art, the driven magnet 95 has its poles reversed with respect to the driving magnet 45, and the magnet 95 follows accurately the rotary movements of the magnet 45 produced by the rise and fall of the float 51, the rotary movements being thus transmitted to the hand or pointer 97, which sweeps over suitable graduations on a dial plate 99 supported by the front ends of a series of posts 101 which have their rear ends fixed to and supported by the case 261. Tightly seated in an internal shoulder near the front end of the bezel 255 is a retaining ring 220 which holds a U-shaped gasket 221 which embraces the periphery of the gauge glass or transparent plate 223 which closes the front of the gauge.

The improved bearing of the present invention is particularly useful, for example, for mounting the post 93 on the stud 91, and the details thereof are best shown in Fig. 2. The front end of the stud 91 is made flat instead of the usual conical shape heretofore employed. The post 93 is provided with a bore 111 having an initial diameter substantially equal to the diameter of the stud 91. Then into this bore 111 is tightly pressed or forced a metal ball or sphere 113 having a diameter very slightly greater than that of the bore 111 and pin 91, the diameter being, for example, .001 or .0005 of an inch larger than the diameter of the pin 91 and bore 111. As this ball 113 forces its way into the bore 111, it burnishes the inner surface of the bore 111 and produces a very highly polished or finished inner surface. This forms an excellent low-friction and accurate lateral bearing for the post 93 on the pin 91, while the ball 113, contacting with the flat or squared end of the pin 91, forms an excellent and accurate thrust bearing to resist the rearward thrust of the post 93 on the pin 91, caused by the attraction between the magnet 95 and the magnet 45.

It is seen that this improved bearing is relatively inexpensive and easy to make, yet gives very improved results as compared with prior bearings of this character. It is an easy and inexpensive matter to burnish or polish the exterior surface of the pin 91 to any degree desired, and it is easy and inexpensive to square off the end of this pin, as compared with the greater expense of accurately forming a tapered or conical end on the pin as has been done in prior practice. Moreover, the squared end of the pin is much less liable to be damaged in handling than the conical or pointed end heretofore used. The internal burnishing or polishing of a small bore such as the bore 111 has heretofore involved difficulties and considerable expense, but in the present improved construction it is very easy and inexpensive, as the mere act of forcing the ball 113 into the bore 111 smooths and burnishes the surface of the bore automatically as the ball moves along it, and the ball itself, cooperating with the squared end of the pin 91, forms a very excellent end thrust bearing.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A gauge of the magnetic drive type including a wall, a driving magnet on one side of said wall, a pin on the other side of said wall in approximate alinement with said driving magnet, a shaft having an axial bore, said shaft being mounted axially on said pin with said pin extending into said bore, and a driven magnet fixed to said shaft in position to be under the magnetic influence of said driving magnet, characterized by a substantially flat end surface on the end of said pin which is within said bore, and a ball seated in said bore and contacting with said flat end surface of said pin to form a low-friction thrust bearing resisting axial thrust of said shaft in a direction along said pin.

2. A construction according to claim 1, further characterized in that said ball is firmly seated in said bore by being tightly pressed therein.

3. A construction according to claim 2 in which said ball is of a diameter slightly larger than the initial diameter of said bore, so that the act of pressing said ball into said bore tends to burnish the walls of said bore to improve the lateral bearing qualities thereof on said pin.

4. A bearing for a rotatable shaft of an indicating instrument, including a pin having a susbtantially flat end surface, a shaft having an axial bore in which said pin is received, and a ball seated in said bore and contacting with said end surface of said pin to form a low-friction thrust bearing resisting axial thrust of said shaft in a direction along said pin, said ball being of a diameter very slightly larger than the initial diameter of said bore so that the act of forcing said ball into said bore tends to burnish the walls of said bore to improve the lateral bearing quantities thereof on said pin, that part of said bore burnished by movement of said ball having an axial length several times its diameter, and the diameter of said pin being substantially uniform throughout the length of said bore and fitting snugly against the burnished walls of said bore from said ball to the outer end of said bore.

5. A gauge of the magnetic drive type including a wall, a rotary driving magnet on one side of said wall, a pin mounted on the other side of said wall in stationary position relative to said wall and approximately in alignment with the rotary axis of said driving magnet and extending in a direction away from said wall to a forward end remote from said wall, a pointer shaft having an axial bore, said pointer shaft being telescoped with said pin and having said pin received longitudinally within said bore to support said pointer shaft from said pin, said pointer shaft having a rear end adjacent said wall and a forward end remote from said wall, a driven magnet secured to said pointer shaft near the rear end thereof and within the magnetic field of said driving magnet, a pointer secured to said pointer shaft near the forward end thereof, said bore in said pointer shaft having a forward end slightly forwardly of said forward end of said pin and the remainder of said shaft forwardly of said bore being substantially solid and imperforate, a spherical ball seated permanently in the forward end of said bore, said ball being harder than the material of said shaft and being initially of a diameter slightly greater than the initial diameter of said bore and being seated in said bore by being forced longitudinally through said bore to size said bore and burnish it to improve the lateral bearing of the walls of said bore on said pin, the forward end of said pin being substantially flat and perpendicular to the length thereof and resting against said ball to act as a thrust bearing to hold said shaft against axial movement toward said wall, the walls of said bore after being sized and burnished by said ball engaging closely around said pin and serving as bearing surfaces to support said pointer shaft and pointer from said pin.

References Cited in the file of this patent

UNITED STATES PATENTS

| | | |
|---|---|---|
| 359,030 | Peterson | Mar. 8, 1887 |
| 751,902 | Dodge | Feb. 9, 1904 |
| 1,174,787 | Wilkinson | Mar. 7, 1916 |
| 1,987,415 | Padgett | Jan. 8, 1935 |
| 2,514,323 | Ford | July 4, 1950 |
| 2,530,934 | Barton | Nov. 21, 1950 |
| 2,566,743 | Okulitch | Sept. 4, 1951 |

FOREIGN PATENTS

| | | |
|---|---|---|
| 220,852 | Great Britain | Aug. 28, 1924 |